Oct. 23, 1956 R. J. ROCKWELL 2,768,249

DEVICE FOR AUTOMATICALLY GOVERNING DYNAMIC LEVEL RANGE IN AUDIO FREQUENCY CIRCUITS

Filed June 7, 1951 5 Sheets-Sheet 1

INVENTOR.
RONALD J. ROCKWELL.
BY
Alden D. Redfield
ATTORNEY.

Oct. 23, 1956 R. J. ROCKWELL 2,768,249

DEVICE FOR AUTOMATICALLY GOVERNING DYNAMIC LEVEL RANGE IN AUDIO FREQUENCY CIRCUITS

Filed June 7, 1951 5 Sheets-Sheet 2

INVENTOR.
RONALD J. ROCKWELL
BY
Alden D. Redfield
ATTORNEY.

INVENTOR.
RONALD J. ROCKWELL.
BY
Alden D. Redfield
ATTORNEY.

INVENTOR.
RONALD J. ROCKWELL
BY
Alden D. Redfield
ATTORNEY.

INVENTOR.
RONALD J. ROCKWELL.
BY
Alden D. Redfield
ATTORNEY.

United States Patent Office 2,768,249

Patented Oct. 23, 1956

2,768,249

DEVICE FOR AUTOMATICALLY GOVERNING DYNAMIC LEVEL RANGE IN AUDIO FREQUENCY CIRCUITS

Ronald J. Rockwell, Cincinnati, Ohio, assignor to Crosley Broadcasting Corporation, Cincinnati, Ohio, a corporation of Ohio Application June 7, 1951, Serial No. 230,382

4 Claims. (Cl. 179—171)

The present invention relates generally to gain control circuits and particularly to systems for automatically governing the dynamic volume range of an audio frequency channel. My invention has particular utility in microphone or transducer circuits as well as in audio channels which are operated in conjunction with a transmitter modulator.

As is well known, overloading on high intensity peaks can not be tolerated in practical transmitter circuits. Also, it is broadly old to compress transducer output signal volume range in order to increase the percentage modulation allotted to low intensity signals and thereby improve the recevied signal to noise ratio on the fringe of the normal reception area. In other words, volume compression circuits, per se, are not new to the art. However, the vast majority of prior art circuits seem to attack the problem of volume compression, peak limiting and automatic volume control from the viewpoint of controlling bias on one or more non-linear amplifier stages, thus controlling amplifier gain directly. Such methods obviously limit the magnitude of input signal which can be handled in the tube and linearly amplified, because the lack of conducting range linearity allows the use of only small incremental sections of the amplifier characteristic. The theory generally followed depends upon the fact that very small increments of any curve can be considered essentially linear. Thus a rapid shift of operating point on a non-linear characteristic curve can be tolerated, from the viewpoint of output linearity, so long as the signal swing to be handled by the tube is small enough to act over only a relatively small portion or increment of the characteristic curve. This limitation on signal magnitude tends to make the circuit very inefficient for use in some types of installations and often a large amount of signal energy is needlessly wasted.

Other circuits have been developed which attempt to solve the problem by including controlled degenerative feedback so as to effectively eliminate amplifier distortion. Though there has been a measure of success with these circuits, it would be desirable to have an automatic dynamic volume level controlled amplifier which could handle relatively large amounts of power without harmonic distortion and without feedback of the distortion correction type.

Therefore, it becomes an object of my invention to provide a signal attenuation network capable of handling push-pull type signals and capable of being varied by either a slowly changing A.-C. signal, a rapidly changing A.-C. signal, or both.

It is another object of my invention to provide an electronically controlled resistance type signal attenuator suitable for attenuating a push-pull signal.

It is also an object of my invention to provide a completely automatic gain control system which limits peak signal amplitude without inserting perceptible harmonic distortion.

It is still another object of my invention to provide an automatic gain control and volume peak limiter circuit which acts to compress signal volume range gradually over a desired range in lieu of the conventional abrupt method.

It is still another and further object of my invention to provide an automatic gain control system capable of handling high level signal surges without introducing transient voltages into the signal.

It is also an object of my invention to provide an automatic gain control circuit in which all A.-C. signal amplifiers operate linearly around a fixed optimum point on their characteristic curve, in lieu of an operating point that depends upon signal intensity.

Briefly, my invention comprises two cascaded signal attenuation networks. In the first or so called slow acting attenuation network, I provide a source of push-pull signals which are fed through a push-pull amplifier using a novel resistance bridge signal attenuator in the anode cathode circuits. This attenuator comprises, in the main, a network of resistances connected on the order of a bridge circuit with electron tubes acting as the variable resistance arms. In order to supply the D.-C. potential for controlling these vacuum tube resistance arms, I provide a rectifier system which has an output vcoltage of one polarity for input signal voltages below a given intensity and an output voltage of opposite polarity for input signal voltages above the given intensity. The rectifier circuit receives its input signal from across the output of the resistance type attenuator, and is coupled to feed an output signal through an integration circuit to control the vacuum tube variable resistance arms. As a result, the complete slow acting network functions to reduce attenuation for signals below a given level and to increase attenuation for signals above the given level. By the use of a time constant or integration circuit in conjunction with the signal rectifier I am able to provide signal attenuation which is related to the average signal strength over a relatively long and selectable period.

The second or fast acting signal attenuation circuit has input terminals which are coupled to the output terminals of the slow acting attenuator network. Similar to the slow acting attenuator, the circuit includes a rectifier and a time constant or integration circuit for averaging out the input signal voltage to provide a D.-C. potential which is related to signal intensity over a selectable time period. In the case of the fast acting network however, it is desirable to select a relatively fast acting integration circuit, in order that a D.-C. signal may be developed which is very closely related to instantaneous signal intensity. The output from this time constant circuit provides a voltage which is fed through an exponential amplifier for controlling a resistance type bridge which is similar to the bridge used in the slow acting attenuation network. In order to eliminate the possibility of transient voltages being inserted into the signal and to speed up, relatively, the effective control action, I incorporate a delay line between the output of the slow acting network and the input of the fast acting attenuation network. The input of the signal rectifier which supplies the control potential for the fast acting attenuator is also connected ahead of the abovementioned delay means. Thus the fast acting resistance attenuator is automatically adjusted before the signal can reach the attenuator input. As a result, I have found that little if any transient voltage is inserted into the signal even though control action is very rapid.

For a better understanding of the present invention, together with other and further objects, advantages and capabilities thereof, reference is made to the following disclosure and appended claims, in connection with the accompanying drawings, in which:

Figure 1A:
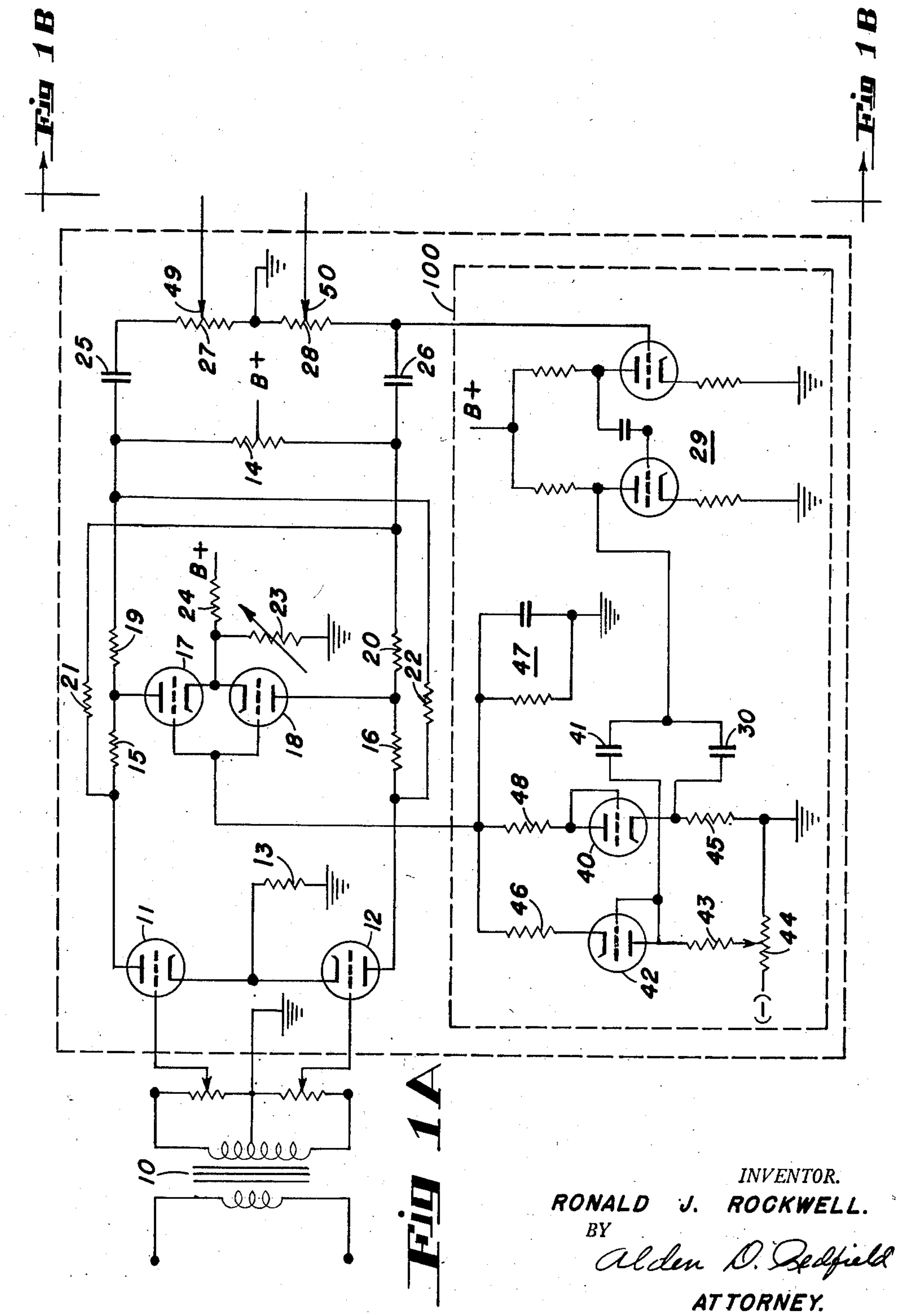
Fig. 1A is a circuit diagram of the slow acting attenuator circuit.
Figure 1B:
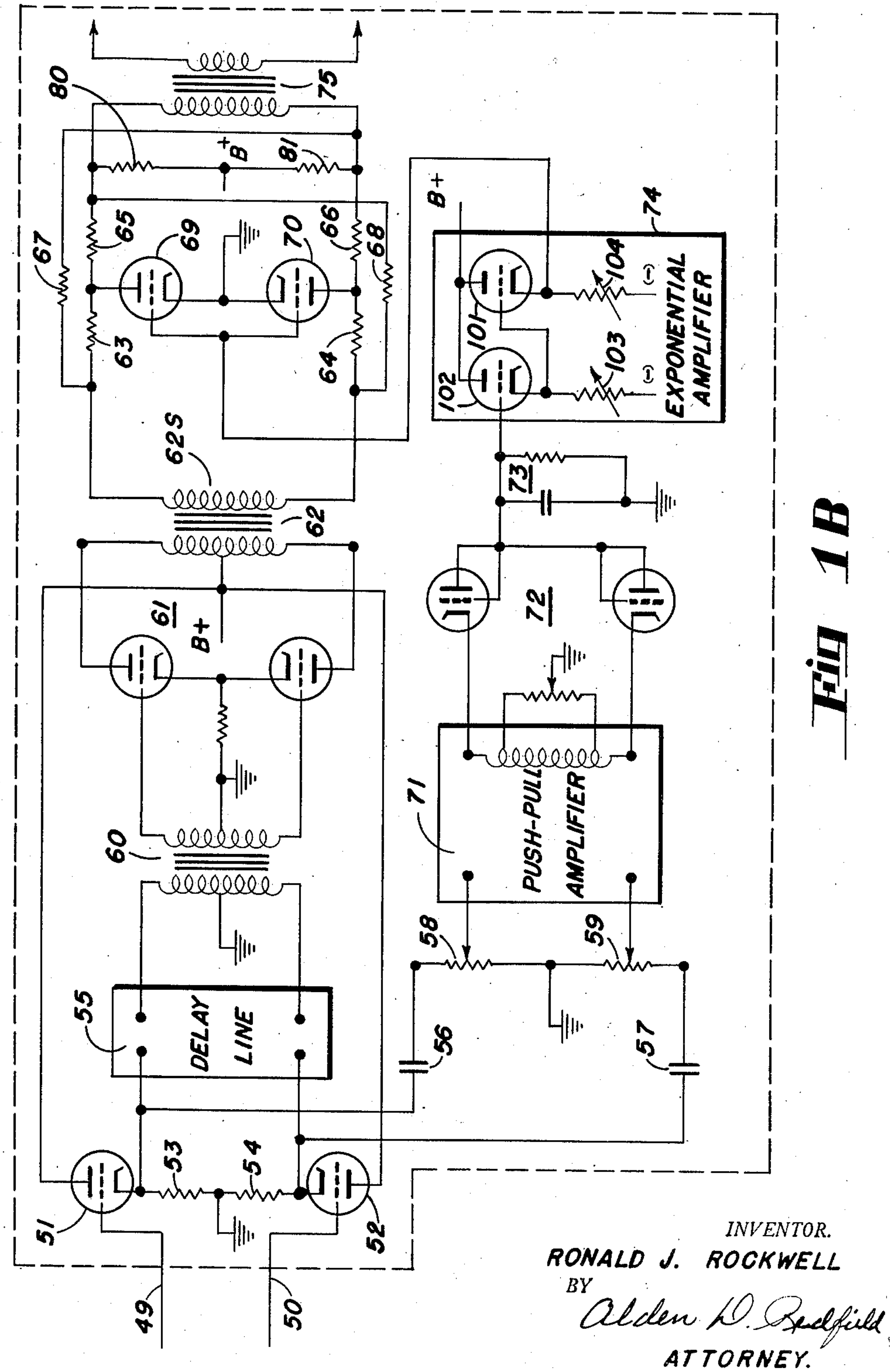
Fig. 1B illustrates an embodiment of a fast acting signal attenuator network which is connected in tandem with the circuit of Fig. 1A.

In Fig. 1A and Fig. 1B I have illustrated the preferred embodiment of my invention. Transformer 10 of Fig. 1A couples a supply of push-pull signals to the grids of class A amplifiers 11 and 12. The cathodes of these two amplifiers are connected to ground through a common resistance 13 while the anode potential is supplied by a source of B+ (not shown) connected to the center tap on resistor 14. As can be seen, the specific resistance type attenuator used in the preferred embodiment is symmetrically arranged relative to ground and forms a part of the anode circuits of amplifiers 11 and 12. For example, resistors 15 and 16, which have similar values, are connected between the anodes of amplifiers 11 and 12 and the anodes of vacuum tubes 17 and 18, respectively, while resistors 19 and 20, which have similar resistance values, are connected between the anodes of vacuum tubes 17 and 18 and the end terminals of resistor 14. Diagonal bridge resistor 21 is connected between the anode of amplifier 11 and the terminal point at which resistors 20 and 14 join. Symmetrically, diagonal bridge resistor 22, which has a resistance value similar to resistor 21, is connected between the anode of amplifier 12 and the terminal point at which resistors 19 and 14 are joined. Symmetry of the network with respect to ground is completed by connecting the cathodes of vacuum tubes 17 and 18 to ground through a common variable resistance 23. The cathodes of these two tubes are biased above ground by the voltage divider action of resistor 24, which is connected to a source of B+ potential, not shown, along with resistor 23. Coupling capacitors 25 and 26 supply the attenuator output signal across series connected resistors 27 and 28. Control potential is tapped off across load resistor 28 and fed to the input of a two stage amplifier 29. The output of amplifier 29, in turn, is coupled through capacitor 41 to the cathode of diode rectifier 40 and also through coupling capacitor 30 to the anode of rectifier 42, which is biased below ground by a connection through resistor 43 to a voltage dividing potentiometer 44. The cathode of diode 40 is connected to ground through resistor 45, and the cathode of diode 42 is connected through resistance 46 to a time constant or integration network 47. The anode of diode 40 is also connected to integration network 47 through a resistor 48. The common connection between resistors 46, 48 and network 47 is connected to the grids of control vacuum tubes 17 and 18 in the resistor attenuator network. As will become apparent, the circuit thus far described comprises what can be defined as the slow acting resistor attenuator network. Referring to Fig. 1B, it will be seen that I have provided a preferred embodiment of a fast acting resistance attenuator network which is connected in tandem or cascade with the slow acting circuit of Fig. 1A.

Taps 49 and 50 on resistors 27 and 28, shown in Fig. 1A, are used to impress the push-pull output voltage of the slow acting attenuator on the grids of class A operated amplifiers 51 and 52 of Fig. 1B. The cathodes of these amplifiers are connected to ground through resistors 53, 54 respectively to form a cathode follower type of push-pull output which is fed to delay line 55 and also coupled through capacitors 56 and 57 to resistors 58 and 59, which have their common terminal connected to ground. The output of the delay line 55 is coupled through transformer 60, and on through push-pull amplifier 61 to coupling transformer 62 which in turn is coupled to the input of a resistance attenuator network similar to the one shown in Fig. 1A. For example, major bridge arm resistors 63 and 64 are selected to have similar resistance values. Also, major bridge arm resistances 65 and 66 are selected to have similar resistance values. Diagonal bridge resistors 67 and 68 have similar resistance values and are connected in circuit symmetry. Vacuum tubes 69 and 70 are connected between the junctions of resistors 63 and 65, and resistors 64 and 66, respectively, to complete the symmetrical relationship. Load resistors 80, 81 are connected to a source of potential B+, not shown. Control potential for vacuum tube resistance arms 69 and 70 is tapped off of resistances 58 and 59, amplified in push-pull amplifier 71 and fed through rectifier 72 to the fast acting integration network 73. The output of the fast acting integration network 73 is fed through a conventional exponential amplifier 74, comprising cathode followers 101 and 102 having variable resistors 104 and 103 connected into their cathode circuits. The output from amplifier 74 is fed to the grids of vacuum tube resistance arms 69 and 70. The final attenuated output signal is taken off of the secondary of coupling transformer 75.

Figure 2A:
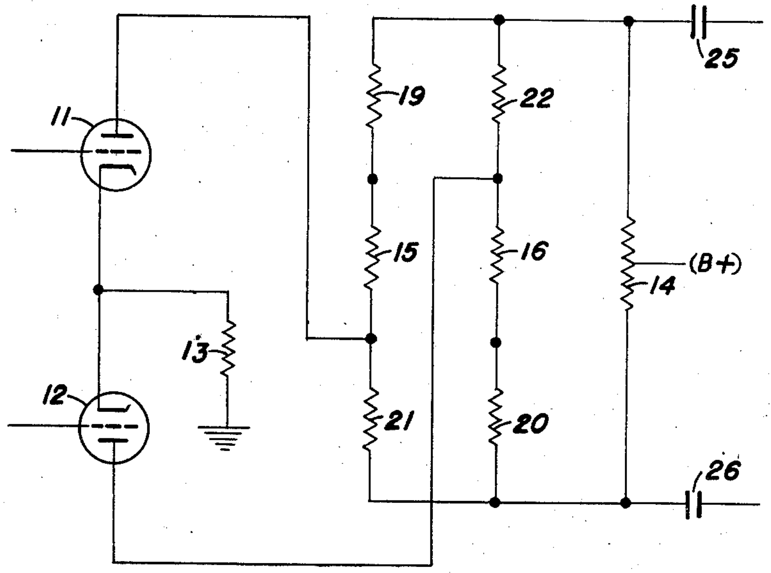
Figs. 2A, 2B, 3A and 3B are equivalent circuit diagrams to be used in explaining circuit operation of Fig. 1A and Fig. 1B.

Considering operation of the illustrated embodiment just defined, it can be seen that push-pull signals fed through transformer 10 in the circuit of Fig. 1A will be amplified by tubes 11 and 12 and presented across load resistors 27 and 28. The A.-C. signal voltage across one half of resistor 14, which may be caused by current flow in either amplifier 11 or amplifier 12, is dependent, from an amplitude viewpoint, upon the setting of the attenuator network connected as part of the anode load resistance between the end terminals of resistor 14 and the anodes of these tubes. Before complete circuit operation can be appreciated, it is necessary to understand the function of the resistance attenuator network, per se, and in order to understand the operational theory of the resistance attenuator network, it is helpful to consider two possible limiting conditions, viz., first where the vacuum tube resistance arms offer very high or maximum impedance and second where the vacuum tube resistance arms are conducting at maximum thus presenting a minimum impedance. Referring to Fig. 2A, an equivalent circuit diagram which I find helpful in explaining operational theory for the first of these limiting conditions, it will be noted that the vacuum tubes 17 and 18 are not shown. Their elimination from present consideration follows from the assumed limiting condition because if these tubes are blocked, their contribution to circuit action can be assumed insignificant, at least for explanational purposes. Still referring to Fig. 2A, further assume that the audio signal presented in push-pull to class A amplifiers 11 and 12 is just starting a positive going excursion on the input of vacuum tube 11 and a negative going excursion on the input of vacuum tube 12. At that time, the major portion of plate current flowing through amplifier 11 is drawn through the upper half of resistor 14, down through major arm resistors 19 and 15, through the plate circuit of amplifier 11 and thus to ground. A small portion of amplifier 11 plate current is also drawn through the lower half of resistor 14 and up through diagonal resistor 21. It is to be noted that the great majority of the current is drawn through resistors 19 and 15 since these resistors are selected to have a much lower impedance than resistor 21. At the same time, the majority of the plate current flowing through amplifier 12 is taken through the lower half of resistor 14, up through resistors 20 and 16 through the plate-cathode path in amplifier 12 and thus to ground. Symmetrically, a small portion of amplifier 12 plate current is taken through the upper portion of resistor 14 down through the relatively high impedance of diagonal arm resistor 22. Thus the potential impressed between the left hand plate of capacitor 25 and ground has two components. Under assumed signal conditions the first component is a large negative going potential brought about by the relatively large increase in current flow through resistors 19 and 15, and the second component is a relatively small positive going potential resulting from decreased current flow through the upper half of resistor 14 down through resistor 22, through the anode-cathode path of amplifier 12 to ground. Thus it now should be apparent, that when the vacuum tube resistance arms are blocked, the upper half of resistance 14 along with resistors 19 and 15 acts as an ordinary voltage divider as far as the signal presented between the left hand plate of capacitor 25 and ground is concerned, and the contribution from resistor 22 is relatively unimportant. Also, it should be apparent that the potential variation presented between ground and the left hand plate of capacitor 26 brought about by amplifier 12 plate current can be considered to arise primarily from the voltage divider action of resistors 14, 16 and 20.

Figure 2B:
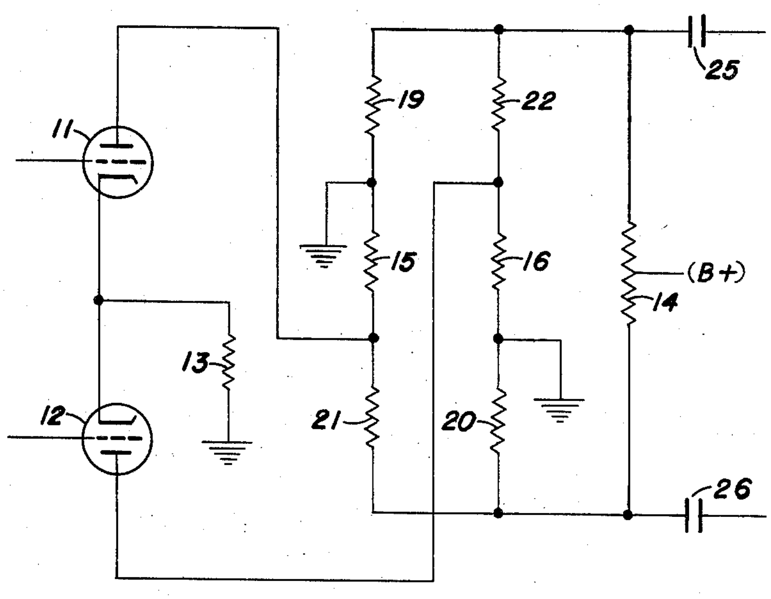

Considering the second limiting condition, where vacuum tube resistance arms 17 and 18 are assumed to offer essentially zero impedance, it will be seen from the equivalent diagram of Fig. 2B that the junction between resistors 19 and 15 and the junction between resistors 16 and 20 can be assumed to be effectively grounded. Again further assuming that the input signal is just starting a positive going excursion at the grid input of class A amplifier 11, it follows that the resulting plate current flow must be drawn entirely through diagonal resistor 21 down through the lower half of resistor 14. Amplifier 11 can not draw plate current through major arm resistor 15 as it did in the previous case, shown in Fig. 2A, because the junction between resistors 19 and 15 is now effectively grounded. Comparing this case with the one illustrated in Fig. 2A it will be remembered that the increased current flow through resistor 21 in Fig. 2A was so small as to be insignificant, with the great majority of the increased current flow being drawn through resistors 19 and 15 to impress a negative drop on the left hand plate of capacitor 25. Now note, that under the conditions assumed in Fig. 2B, increased current flow through amplifier 11 results in a negative drop on the left hand plate of capacitor 26, with the potential on the left hand plate of capacitor 25 moving in the positive-going-direction due to the decrease of current flow through the upper portion of resistor 14 down through diagonal resistor 22 and through the plate circuit of amplifier 12. It now should be apparent that when vacuum tube resistance arms 17 and 18 offer very high or infinite impedance, the output signal across load resistors 27 and 28 has its highest amplitude of a given polarity. Further, it should now be apparent that as the resistance of vacuum tubes 17 and 18 decreases, the amplitude of the output signal also decreases. Also, it should be clear that there must be a point at which the impedance value of these tube resistance arms can be set where there will be zero output signal and if the tube impedance is decreased still further the amplitude of the output signal increases but in the opposite polarity direction. In other words, I have provided a resistance type attenuator network having electron tubes acting as variable resistor arms wherein it is possible to vary not only the amplitude of a push-pull signal across output load resistors 27 and 28 but also, if desired, the polarity of the signal. Though I do not intend to be limited thereby, it is to be noted that the polarity reversal function of the network is not utilized in the specific embodiment illustrated. To control the attenuation factor of the network and thus the amplitude of the output signal, I provide a control circuit designated in Fig. 1A by the dashed line rectangle 100.

The signal voltage fed to the control circuit 100 is taken from the output of the attenuator across output resistor 28 and impressed across the input of a two stage amplifier 29. Amplifier 29 could be any conventional type of amplifier and could be connected in push-pull if so desired. The output from amplifier 29 is in turn fed through coupling capacitors 41 and 30 to the cathode of diode 40 and the anode of diode 42. These two diodes are connected in such a manner as to form what might be defined as a threshold biased rectifier system. Before considering the manner in which this rectifier circuit operates it should be noted that resistor 46 which is connected to the cathode of diode 42 must be selected so as to have a much lower value than resistor 48 which is connected to the anode of diode 40. It has been found that a relationship on the order of approximately ten to one between these resistor values allows the control circuit to function satisfactorily. Other designs may require considerable change in this relationship; however, it is believed that such selection is fully within the scope of any one skilled in the art who understands the operational theory of the disclosed embodiment. Also, resistor 43, which is connected between the anode of diode 42 and potentiometer 44, and resistor 45, which is connected between the cathode of diode 40 and ground, are preferably selected to have the same resistance value in order to provide essentially a balanced parallel load on the output of amplifier 29.

The A.-C. signal voltage component impressed across output load resistor 28 is amplified in class A operated amplifier 29, and coupled through coupling capacitors 30 and 41 to the threshold biased rectifier circuit. Thus positive and negative voltage values, both proportional to the signal impressed across resistor 28, are impressed on the anode of diode 42 and on the cathode of diode 40. For purposes of explanation, assume that the input signal voltage taken from the output of amplifier 29 has an amplitude which is less than the bias setting on potentiometer 44. Under this condition the anode of diode 42 can not be driven positive relative to the cathode of diode 42 and thus the diode can not conduct. On the other hand, diode 40 starts conducting almost immediately, being so driven by the negative portion of the signal impressed across resistance 45. This voltage causes current to flow through resistor 48 and through diode 40. However, as soon as the input signal voltage amplitude increases to a point sufficient to overcome the bias established on potentiometer 44, current starts flowing through diode 42 and resistor 46. As previously mentioned, resistor 48 is selected to have a much higher value than resistor 46. Thus it will be seen that any signal which is strong enough to overcome the threshold bias potential set on the anode of diode 42 will cause a greater current to flow through resistor 46 than will be caused to flow through resistor 48 by action of the same signal on diode 40. In order to integrate the rectified output potential, I provide a time constant circuit 47 connected between ground and the junction of resistors 46 and 48. The polarity as well as the magnitude of the charge impressed on the integrator capacitor is basically dependent upon whether or not diode 42 is conducting, which, as previously stated, happens whenever the input signal amplitude is able to overcome the bias established on potentiometer 44. In other words, if the input signal has an amplitude below the potential established on potentiometer 44, diode 40 conducts, charging this capacitor so as to make its ungrounded plate negative with respect to its grounded plate. On the other hand, when the signal amplitude is sufficient to overcome the bias potential, then current flows through diode 42 so as to charge the ungrounded plate of the capacitor positive relative to its grounded plate. Obviously, the time constant of the integrator circuit 47 may be selected in accordance with the period over which it is desired to have the attenuation network respond.

Since integration network 47 is coupled to the grids of control tubes 17 and 18, signals having a lower amplitude than the threshold potential set on the anode of diode 42 bias control tubes 17 and 18 negatively or in other words toward cut-off. As a result, it follows that less current flows through control tubes 17 and 18 and a larger signal is impressed across load resistors 27 and 28. However as soon as the signal amplitude becomes sufficient to overcome the bias on diode 42, current flow through resistor 46 reverses the charge on the ungrounded plate of the integrator capacitor to place a more positive bias on the grids of control tubes 17 and 18, which as has been explained, acts to decrease the signal amplitude across load resistors 27 and 28. Thus, it will be seen, I have provided an automatic signal attenuator capable of controlling signal amplitude with relation to the average signal realized over a given integration time period.

Figure 4B:
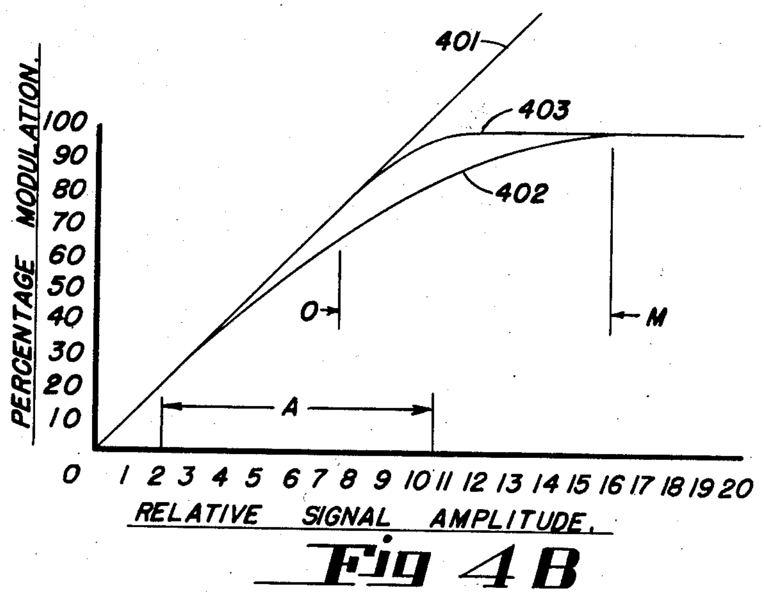
Figs. 4A and 4B are attenuator characteristic control curves.
Figure 4A:
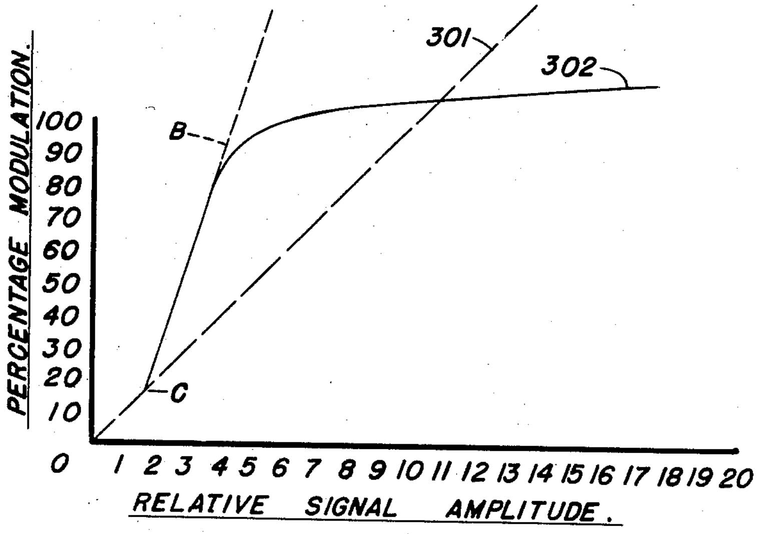

In Fig. 4A I have shown two curves which illustrate the controlling action of the specific embodiment shown in Fig. 1A. Percentage modulation is plotted on the ordinate and relative signal amplitude is plotted on the abscissa. Dotted curve 301 is intended to show the characteristic of a completely linear amplifier without volume control while idealized curve 302 shows the characteristic control curve for the slow acting attenuator. It will be noticed, comparing these two curves, that as the volume increases from zero, the curves coincide for a short distance. Then, when sufficient signal is fed into control circuit 100 so as to cause diode 40 to conduct, the resultant negative charge placed on integrator 47 increases the resistance of vacuum tubes 17 and 18, thereby decreasing the attenuation impedance of the network. At that point, shown at C, characteristic curve 302 breaks away from and rises more rapidly than the characteristic curve of the linear amplifier. At point B on cure 302 the signal amplitude becomes great enough to overcome the bias established on the plate of diode 42 and it conducts current, thereby overcoming the charge placed on integrator 47 by current flow through diode 40. As a result, vacuum tubes 17 and 18 start to conduct more heavily to increase the attenuation of the network. As the signal increases in amplitude, diode 42 conducts still more heavily and the attenuation of the network increases still further. Thus the characteristic curve 302 bends or starts to level off at a desired level which in the illustrated embodiment was somewhere in the neighborhood of one hundred percent modulation. It seems apparent that the combined action of all of the components in the slow acting attenuator circuit provides a slow gentle control over average signal level, somewhat analogous to the action of an operator varying general signal level by manual control.

So far I have explained how the signal has been attenuated to remove gradual intensity changes, leaving to be considered the tandem connected fast acting circuit. The fast acting automatic signal attenuator illustrated in Fig. 1B functions in a manner somewhat analogous to the slow acting attenuator but at a much faster rate. The sole purpose of this second attenuator is to take care of exceedingly rapid signal surges realized across the previously mentioned load resistances 27 and 28, shown in the output of the slow acting attenuator circuit of Fig. 1A. The signal impressed across these load resistors is first amplified by amplifiers 51 and 52, which may be of the cathode follower type, as illustrated, and then fed to the input of delay line 55. The output of cathode-follower amplifiers 51 and 52 is also coupled to a rectifier system through push-pull amplifier 71, where it is rectified and impressed across a time constant circuit or fast acting integration circuit 73. It is to be noted that the charging rate of the integrating network 73 is controlled, in the main, by the impedances of the rectifying diodes and their input circuit in conjunction with the capacitance of the integrator capacitor. By using low impedance diodes, the charge time constant can be made practically instantaneous. The discharge time constant of the network is controlled by the value of the resistor shunted across the integrator capacitor, which is selected with several factors in mind. First, the charge across the integrator should not exactly follow decreasing signal intensity values but rather should lag slightly in time phase. This criterion has been established by tests and proved to be more satisfactory because it allows the attenuating action of the circuit to be averaged out rather than drop off abruptly after a high intensity surge has been attenuated. Second, the time constant of this integration circuit dictates the amount of delay necessary in delay line 55 and obviously a short delay period can be more readily supplied than a longer one. The resultant integrated control signal is fed through a D.-C. exponential amplifier 74, the purpose of which will be explained, and the output used to control the resistance of tubes 69 and 70 in a manner similar to that described in connection with the circuit of Fig. 1A.

The input to the fast acting resistance bridge type attenuator is taken from across the output of push-pull connected amplifier 61 which in turn is coupled to the output of delay means 55. The purpose of delay means 55 is to delay the input signal for a period long enough to allow a control potential to be developed and applied to the fast acting resistance bridge type attenuator. Thus the attenuation offered by the network is adjusted before the signal to be attenuated is placed across its input terminals and it should be noted that the delay period is selected to be substantially equal to the time required for the control circuit to adjust the fast acting resistance bridge attenuator. If the delay is too long, control action will be apparent on signals which are ahead of the high intensity surges in time phase and obviously such action must be minimized. On the other hand if the delay period is too short a portion of the high intensity signal will pass through the network without proper attenuation. Thus the basic points to be considered in selecting the optimum delay period are first, the charging time constant selected for the integrator circuit, and second, the time period required for the attenuator bridge to assume a controlled position once a control potential is impressed on the grids of the control tubes. The purpose of the exponential amplifier will now be explained.

Though the bridge networks used in the slow acting attenuator circuit and the fast acting attenuator circuit have a control characteristic such that equal incremental changes in control potential do not exactly produce equal incremental attenuation changes, this is of no importance when a rectified feed-back type circuit is used as is shown in Fig. 1A. However, this factor enters importantly into the choice of amplifier characteristics necessary in exponential amplifier 74, as used in the fast acting attenuation circuit. In order to understand this it must be remembered that there is a given control potential which completely balances the bridge type attenuator, causing one hundred percent attenuation of the input signal. Further, it must be realized that this action can not take place in the slow acting circuit because the vacuum tube resistance arms are controlled by a signal which is taken from the output of the slow acting attenuator itself. In other words, since it takes a maximum signal to drive the attenuator bridge to one hundred percent attenuation, the fact that the control potential for the vacuum tube resistance arms is taken from the output of the bridge, in the slow acting circuit of Fig. 1A, eliminates any possibility of of one hundred percent attenuation because if one hundred percent attenuation were realized, there would be no control signal. Such a condition is patently impossible. In the fast acting attenuator, however, the control action is taken from a point ahead of the bridge, which means that the fast acting bridge has no control over its own control potential, the magnitude of the fast acting bridge control signal being entirely independent of the setting of the fast acting bridge network. It follows, then, that an input signal could have sufficient magnitude to drive the fast acting attenuator bridge network to one hundred percent attenuation if a control potential linearly related to the input signal were used. To get around this, an exponential amplifier is connected into the control signal channel and an exponential characteristic is selected, by test, such that the control potential is always less than the potential required to balance out the bridge over the operating range of the circuit. Variable resistors 103, 104 are supplied in the cathode circuits of the exponential amplifier 74 for varying the output characteristic of the amplifier. Also potentiometers 58 and 59 are supplied to control the grid drive and thus the output of push-pull amplifier 71. The proper operating point for these controls can be selected from data taken in a simple operating test. First, a test signal is impressed across potentiometers 58 and 59. Potentiometers 58 and 59 along with the exponential amplifier cathode resistors are then incrementally varied and an output vs. input characteristic curve is plotted for various settings of the controls. The controls are then adjusted from the curve data so that the attenuator works along a curve similar to curve 402 of Fig. 4B without ever driving the bridge to one hundred percent attenuation.

Figure 3A:
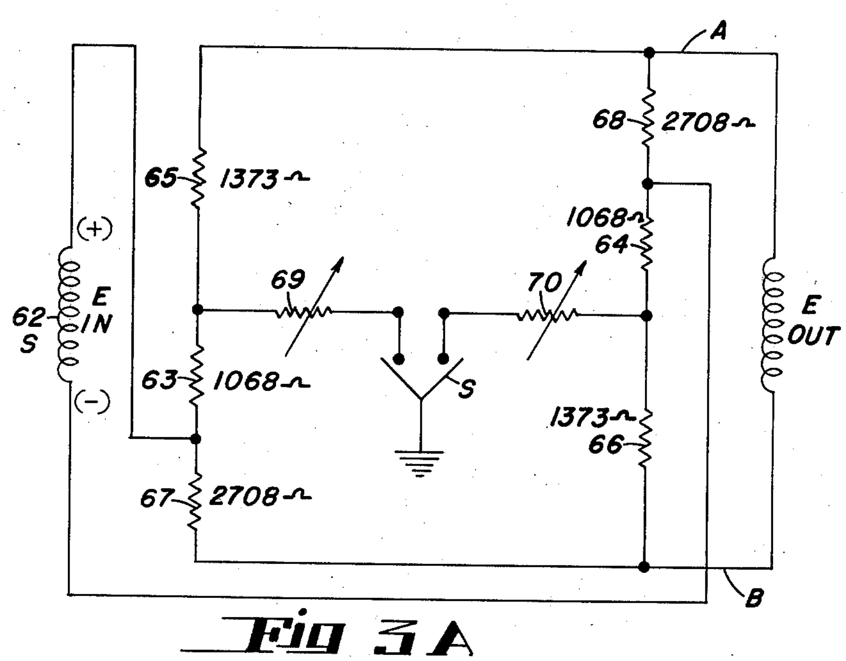

The resistance bridge used in the fast acting circuit is symmetrically arranged in the same manner as the slow acting resistance bridge, symmetry being maintained with respect to the major arms and the diagonal arms. However, the fast acting bridge is not directly connected into an amplifier anode-cathode circuit as is the slow acting bridge and thus the action is slightly different. In Fig. 3A I have shown an equivalent diagram of the fast acting attenuator bridge circuit which can be used to explain operation under various control signal conditions. It will be noticed, by comparing Fig. 3A and Fig. 1B, that vacuum tubes 69 and 70 have been replaced with variable resistors in the equivalent circuit of Fig. 3A. Also it will be noticed that a switch means S has been included. The purpose of the switch is to simulate actual circuit conditions realized when the vacuum tube resistance arms are biased above or below cut-off. To understand operation, first assume that an A.-C. signal voltage $E_{in}$ is impressed across the input transformer, 62*s*, with an instantaneous polarity as indicated. Also assume that the arms of switch S are open; in other words, vacuum tubes 69 and 70 are assumed to be cut-off. Under these conditions, A.-C. signal current will flow from the positive side to the negative side of transformer 62*s* over two paths, viz., (1) through resistor 63, resistor 65 and resistor 68 and (2) also through resistors 67, 66 and 64. Since the total resistance represented by resistors 63 and 65 is less than that of resistor 67, there is a larger drop across resistor 67 than there is across resistors 63, 65. Therefore, terminal A, on the output transformer, is made positive relative to terminal B, signal current flowing from terminal A to terminal B. Now if it be assumed that both arms of switch S are closed so as to connect the variable resistors to each other, it can be seen that a third current path is formed through resistors 63, 69, 70 and 64. The amount of current that flows through this third path is controlled by the magnitude of the input signal as well as the resistance settings of the variable resistors. It will be apparent, still assuming that the input signal has an instantaneous polarity as indicated, that any signal current conducted over this third path tends to increase the drop across resistors 63 and 64. It will also be apparent that this current flows into the junction of resistors 63 and 67 up through resistor 63, through resistors 69, 70 and 64 back to the negative side of input transformer 62*s*, producing a drop across resistor 63 having a polarity such as to lower the potential at the junction of resistors 63 and 65 relative to the potential at the junction of resistors 63 and 67. It follows, then, that there is a resistance setting, to which variable resistors 69 and 70 may be adjusted, which will produce enough additional drop across resistor 63 so as to make terminal A have zero potential relative to terminal B. It also can be seen that if sufficient current is taken through this third path the drop across resistor 63 will become large enough and have the correct polarity so as to make terminal A negative with respect to terminal B. At this point signal current will of necessity flow from terminal B through the output transformer to terminal A. From this it follows that the fast acting attenuator bridge is capable of varying the output signal from a maximum potential of one polarity down through zero potential up through a maximum potential of opposite polarity. In other words, the bridge has two functions, viz., a signal attenuation function and a polarity reversal function much the same as has been explained with regard to the slow acting attenuator bridge. As has been said, in the specific embodiment disclosed the polarity reversal function is not utilized; however, it is possible to take advantage of this action and I do not intend to be limited to the specific embodiment shown.

Figure 3B:
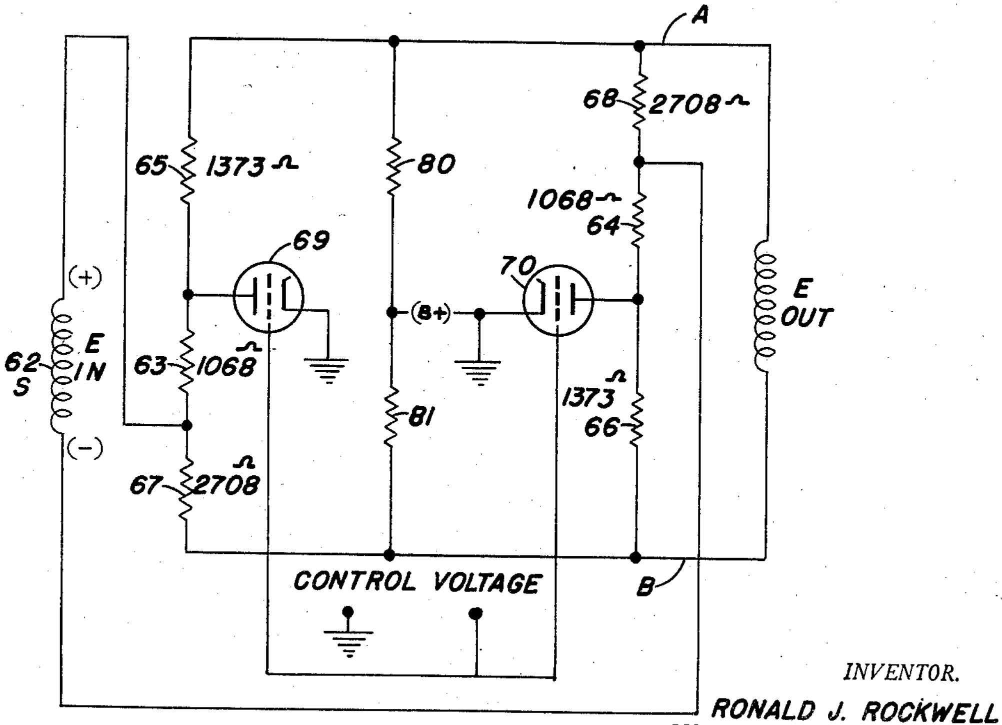

In Fig. 3B I have shown a rearranged schematic circuit diagram of the fast acting attenuator bridge laid out in a form so as to make a comparison between the equivalent circuit of Fig. 3A and the actual fast acting attenuator circuit readily understandable. Referring to Fig. 3B, if it be assumed that vacuum tubes 69 and 70 are cut-off, it can be seen that the circuit of Fig. 3B functions in the same manner as does the circuit of Fig. 3A when switch S is open. In other words, if an A.-C. input signal has an instantaneous polarity as indicated on the drawing, terminal A of the output transformer will be driven positive relative to terminal B because the signal current drop through diagonal resistance arm 67 is greater than the potential drop through major arm resistors 63, 65. Also, it will be apparent that the polarity of the output signal reverses when the polarity of the input signal reverses.

Considering operation of the circuit of Fig. 3B when vacuum tubes 69, 70 present a finite impedance to the A.-C. signal to be attenuated, it will be seen, by comparison to Fig. 3A, that it is necessary for the vacuum tube resistance arms to have a substantially constant A.-C. plate resistance, $r_p$, for each setting of the control grid voltage taken from the output exponential amplifier 74. In order to keep the A.-C. plate resistance of the vacuum tube bridge arms substantially constant it is necessary to supply a D.-C. plate potential which has a magnitude on the order of ten times the magnitude of the maximum A.-C. signal to be impressed across the plate cathode paths of the tubes. This plate potential is connected between ground and the junction of resistors 80, 81, the combination being connected across output terminals A, B. The D.-C. current that flows in the circuit can be ignored, in so far as the attenuating action of the bridge is concerned, if it is remembered that the only function of the D.-C. current is to make the A.-C. plate resistance, or $r_p$, of the vacuum tubes substantially constant for any one setting of the grid cathode control potential. Now considering the action of the bridge circuit shown in Fig. 3B from an A.-C. signal viewpoint, it will be apparent that an input signal having a voltage polarity as indicated on the drawing will increase the A.-C. drop across resistors 63 and 64 in much the same manner as has been explained with regard to the circuit of Fig. 3A. Also when the polarity of the input signal voltage changes it will be apparent that the polarity of the A.-C. drop across resistors 64 and 63 will also change. It can now be seen that the attenuator bridge circuit of Fig. 1B is as capable of varying the output signal from a maximum of one polarity down through zero potential and up through a maximum potential of opposite polarity, as is the equivalent circuit of Fig. 3A, and that the action of the attenuator bridge circuit of Fig. 1A is very similar.

Operation of the circuits of Fig. 1A and Fig. 1B when cascaded will now be considered, with reference to the curves of Fig. 4A and Fig. 4B, which are idealized characteristic curves of the slow acting and the fast acting circuits respectively. Assuming that my novel circuit combination is connected into a broadcast transmitter, before adjusting the circuit it is necessary to determine, as accurately as is possible, the estimated program volume range. For example, the program volume range might be similar to range A shown in Fig. 4B. From this can be determined the maximum signal volume to be impressed on the input of amplifiers 11 and 12. Next, the bias on the vacuum tube resistance arms is set so that the slow acting attenuator is operating at approximately point B along the curve 302 of Fig. 4A at maximum signal intensity. Then the input of the fast acting attenuator, on load resistor taps 49 and 50, is adjusted so as to place the anticipated maximum signal swing at M on curve 402 of Fig. 4B. If the program volume range is similar to range A, and the peak is at point M on curve 402, it follows that the minimum range should strike curve 402 approximately at O.

When the actual signal is fed into the circuit, after it has been adjusted in the manner described, the slow acting attenuator will take up its normal operating position along curve 302, while the fast acting attenuator will take up a normal operating position between the limits of M and O on curve 402. If a fairly rapid signal surge, i. e., one which is too rapid to be handled by the slow acting network, because of its inherently slow time constant, hits the circuit, the slow acting network will fail to respond and the signal will be a amplified in this network along a curve shown by the dashed line tangent to point B on curve 302 in Fig. 4A. However, the fast acting attenuator, having a very short time constant control circuit, rapidly responds to limit the signal amplitude along curve 402 somewhere above point M, if the signal is outside of the anticipated volume range. As has been explained, because of the delay line shown at 55 in Fig. 1B the control action of the fast acting attenuator circuit responds very rapidly. Since the control action is not one which varies over the cycle of the signal, per se, but rather takes up a setting and holds it so long as the signal remains at a constant peak volume, the only harmonic distortion that results is introduced from one or two signal cycles at the most. If the circuit has been adjusted in the manner described, essentially no distortion will be realized. If this signal strength is maintained for a period long enough for the slow acting time constant circuit to charge up, the amplification characteristic of the slow acting network will be slowly moved back along the dashed line and assume a position on curve 302. The resulting increased attenuation, which is ahead of the fast acting circuit, forces the output signal in the fast acting circuit to be moved back down along characteristic curve 402, until the attenuator takes up its normal position, attenuating the signal between the limits of M and O. Thus it can be seen that the cascaded circuit combination acts as a unit to control signal volume swing over a dynamic range, limiting the peaks of instantaneous signal surges.

Referring again to the curves of Fig. 4B, with respect to the linear amplification curve 401, it can be seen that a program volume range having a swing equal to A would result in a "full expression" output swing between one hundred percent modulation and twenty percent modulation. Using my novel circuit the same volume range is made to swing between point M and point O on curve 402, resulting in a compressed volume range output varying between approximately sixty percent modulation and one hundred percent modulation. "Volume compression" has a decided advantage over "full expression." With "full expression" transmission, i. e., linear amplification, receivers at some given distance from the transmitter would obviously have a difficult task in discriminating against background noise, and weak parts of the modulation would be so intermingled with noise as to be practically useless. However the same receiver at the same given distance from the transmitter, assuming that the same amount of power is used at one hundred percent modulation, would be able to receive the volume compressed signal without noise difficulty, because the minimum modulation point would be somewhere around sixty percent, considerably higher than the twenty percent modulation point of "full expression." In other words, it is possible to increase the area of reception of a transmitter having a given amount of power by compressing the volume range of the transmitted signal so that the minimum average signal swing is always held at a fairly high percentage modulation point. The economics of the situation are so obvious that further explanation of the advantages of volume compression seems unnecessary.

Even though fringe area reception is improved, regardless of the type of volume compression used, I have found that a volume compression curve similar to curve 402 has the decided advantage of making volume compression so gradual that it is practically impossible for an average listener to tell the difference between the volume compressed reception and the ideal "full expression." This is to be compared with prior art curves such as curve 403 of Fig. 4B which use an abrupt limiting curve that can be quite noticeable because of the sudden shrinkage of the dynamic characteristic at one hundred percent modulation.

It will now be apparent that I have provided an automatic volume control circuit comprising a slow acting dynamic volume control circuit (Fig. 1A) and a fast acting dynamic volume control circuit (Fig. 1B) connected in cascade, said slow acting dynamic volume control circuit comprising a push-pull amplifier (11, 12) having an input circuit (transformer 10) connected across a source of push-pull signals, and two anode circuits, a resistance bridge having a major arm (15, 19 and 16, 20) connected in each of said anode circuits, diagonal resistance arms (21, 22) for said bridge, symmetrically connected D.-C. controlled variable resistance arms (17, 18) for said bridge, control means (29, 40, 42 and 47) connected between the output of said bridge and said variable resistance arms (17, 18) for supplying a control potential to said variable resistance arms which varies in response to gradual volume level changes in the push-pull output (28) of said bridge; said fast acting dynamic volume control circuit comprising a second resistance bridge having major resistance arms (63, 65 and 64, 66) diagonal resistance arms (67, 68) and symmetrically connected D.-C. controlled variable resistance arms (69, 70) control means (71, 72, 73 and 74) coupled between the output of said slow acting dynamic volume control amplifier and the D.-C. signal controlled variable resistance arms (69, 70) in said second resistance bridge for supplying a control potential which varies in response to instantaneous changes in push-pull signal volume level, delay means (55) coupled between said second resistance bridge and the output of said slow acting dynamic volume control amplifier, said delay means providing a signal delay substantially equal to the time period required for a signal fed to said control means to change bridge attenuation.

While I do not desire to be limited to any specific parameters, such parameters varying in accordance with requirements of individual designs, the following circuit values have been found to be entirely satisfactory in the specific and successful illustrated embodiment of the invention:

| Tubes: | | Type |
|---|---|---|
| 11, 12, 17, 18, 29, 51, 52, 61 | | 6SN7G |
| 69, 70, 72 | | 6AS7 |
| 101, 102 | | 6SK7 |
| 40, 42 | | 6J5 |
| **Resistors:** | | **Values** |
| 15, 16 | ohms | 25,000 |
| 19, 20 | do | 27,000 |
| 21, 22 | do | 100,000 |
| 43, 45 | do | 100,000 |
| 46 | megohms | 1 |
| 48 | do | 10 |
| 63, 64 | ohms | 1,068 |
| 65, 66 | do | 1,373 |
| 67, 68 | do | 2,708 |

While there has been shown and described what at present is considered the preferred embodiment of the present invention, it will now be obvious to those skilled in the art that various changes and modifications may be made therein without departing from the invention as defined in the appended claims.

I claim:

1. A controlled volume compressor comprising: a slow-acting signal attenuating unit including an output circuit, an input circuit coupled to a push-pull source of audio frequency signals, and electron valve means of the type responsive to a control voltage of negative polarity to decrease attenuation and of positive polarity to increase attenuation; a rearward-acting level control unit coupled between said output circuit and said valve means for producing a control voltage which is of negative polarity for input signals below a predetermined level and of positive polarity for input signals above said level, said control unit comprising a high impedance diode circuit for providing the negative portion of such control voltage and an opposing delayed low impedance diode circuit for providing the positive portion of such voltage, a slow-acting integrating circuit connected to and providing a load for both of said diode circuits, means for coupling both of said diode circuits to the output circuit of said attenuating unit, and means for coupling said integrating circuit to said valve means to apply the control voltage thereto, the slow-acting attenuating unit and its valves and the level control unit and its diodes and integrating circuits being so proportioned as to hold the output signals of the attenuating unit near such predetermined level; a fast-acting signal attenuating unit including an output circuit, an input circuit, and electron valve means of the type responsive to a control voltage to vary attenuation; an audio signal delay network coupled between the last-named input circuit and the output circuit of the slow-acting attenuating unit; a forward-acting control unit including a rectifier, a fast-acting integrating circuit and an exponential amplifier coupled in cascade between the output circuit of the slow-acting unit and the electron valve means of the fast-acting attenuation unit, said fast-acting attenuating unit and said forward-acting control unit being so proportioned as to produce an exponential volume compression characteristic having a region in which power output gradually and smoothly varies from 60% to 100% when plotted as ordinates on a Cartesian frame of coordinates against input signal levels varying from 0% to 100% plotted as abscissae, the components of the slow-acting attenuating unit and the control unit for same being proportioned to maintain the above-mentioned predetermined level in that region of such compression characteristics.

2. A controlled volume compressor comprising: a slow-acting signal attenuating unit including an output circuit, an input circuit coupled to a push-pull source of audio frequency signals, and electron valve means of the type responsive to a control voltage of one polarity to decrease attenuation and of opposite polarity to increase attenuation; a rearward-acting control unit having diode and integrating circuits coupled between said output circuit and said valve means for producing control voltage which is of one polarity for input signals below a predetermined level and of opposite polarity for input signals above said level, the components of the attenuating unit and the control unit and its diode and integrating circuits being so selected as to hold the mean intensity of the output signals of the attenuating unit near such predetermined level; a fast-acting signal attenuating unit including an output circuit, an input circuit, and electron valve means of the type responsive to a control voltage to vary attenuation; an audio signal delay network coupled between the last-named input circuit and the output circuit of the slow-acting attenuating unit; a forward-acting control unit coupled between the output circuit of the slow-acting unit and the electron valve means of the fast-acting unit, said fast-acting attenuating unit and said forward-acting control unit being so proportioned as to produce an exponential volume compression characteristic having a region in which power output gradually and smoothly varies from 60% to 100% when plotted as ordinates on a Cartesian frame of coordinates against input signal levels varying from 0% to 100% plotted as abscissae, the slow-acting attenuating unit and its valves and the control unit for same being so selected and proportioned as to maintain the above-mentioned predetermined level in that region.

3. In combination, a source of audio frequency signals, an attenuating network having an input circuit and an output circuit, said input circuit being coupled to said source, said network being of the type whose attenuating characteristic is governed by a control voltage, and a rectifying system for developing said control voltage, said rectifying system comprising a pair of diode tubes each having an anode and a cathode, a relatively high resistor connected to the anode of one of said diodes, a relatively low resistor connected to the cathode of the other of said diodes, an integrating network comprising a parallel combination of resistance and capacitance conductively connected to the junction of said resistors, means including resistance-capacitance networks for coupling the output circuit of said attenuating network to the remaining electrodes of said tubes, a source of biasing potential having a positive terminal conductively connected to the cathode of said one diode and its negative terminal conductively connected to the anode of said other diode, said source furnishing a negative charge to the integrating network through the high resistance path of the circuit of said one diode when the output of the attenuating network is insufficient to render the other diode conductive, the output of the attenuating network furnishing an opposing positive charge to the integrating network through the low resistance path of said other diode when the output of said attenuating network is of sufficient intensity to overcome the negative bias on the anode of said other diode and to render it conductive, and a conductive connection from said integrating network to said attenuating network for applying to said attenuating network the control voltage developed in said integrating network.

4. In combination, a source of audio frequency signals, an attenuating network having an input circuit and an output circuit, said input circuit being coupled to said source, said network being of the type whose attenuating characteristic is governed by a control voltage, and a rectifying system for developing said control voltage, said rectifying system comprising a pair of diode tubes each having an anode and a cathode, a relatively high resistor connected to the anode of one of said diodes, a relatively low resistor connected to the cathode of the other of said diodes, an integrating network comprising a parallel combination of resistance and capacitance conductively connected to the junction of said resistors, means including resistance-capacitance networks for coupling the output circuit of said attenuating network to the remaining electrodes of said tubes, a source of biasing potential having a positive terminal conductively connected to the cathode of said one diode and its negative terminal conductively connected to the anode of said other diode, said resistance-capacitance networks including equal individual resistors connected between the positive terminal of said biasing source and the cathode of said one diode and between the negative terminal of said biasing source and the anode of said other diode, said source furnishing a negative charge to the integrating network through the high resistance path of the circuit of said one diode when the output of the attenuating network is insufficient to render the other diode conductive, the output of the attentuating network furnishing an opposing positive charge to the integrating network through the low resistance path of said other diode when the output of said attenuating network is of sufficient intensity to overcome the negative bias on the anode of said other diode and to render it conductive, and a conductive connection from said integrating network to said attenuating network for applying to said attenuating network the control voltage developed in said integrating network.

References Cited in the file of this patent

UNITED STATES PATENTS

| | | |
|---|---|---|
| 1,891,297 | Wintringham | Dec. 20, 1932 |
| 1,978,184 | Aubert | Oct. 23, 1934 |
| 2,144,995 | Pulvari | Jan. 24, 1939 |
| 2,204,726 | Davis | June 18, 1940 |
| 2,263,683 | Rockwell | Nov. 25, 1941 |
| 2,329,558 | Scherbatskoy | Sept. 14, 1943 |
| 2,569,000 | Hadfield | Sept. 25, 1951 |
| 2,581,124 | Moe | Jan. 1, 1952 |
| 2,626,322 | Appleman | Jan. 20, 1953 |